April 6, 1948.  C. E. TACK ET AL  2,439,349
SHOCK STRUT
Filed Oct. 6, 1944
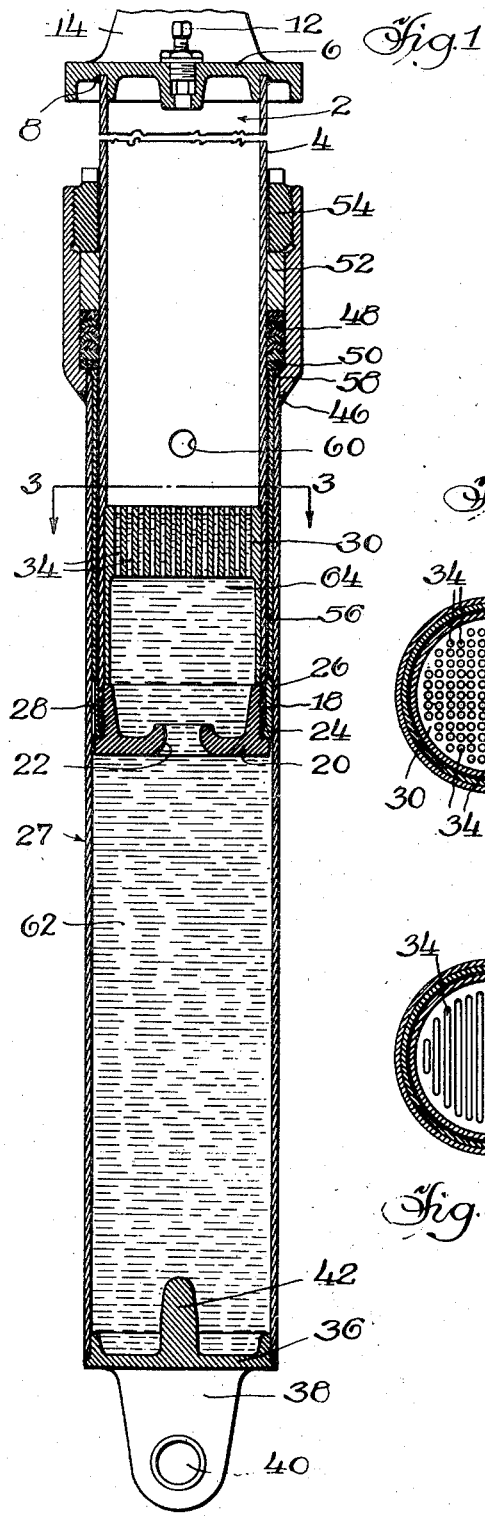
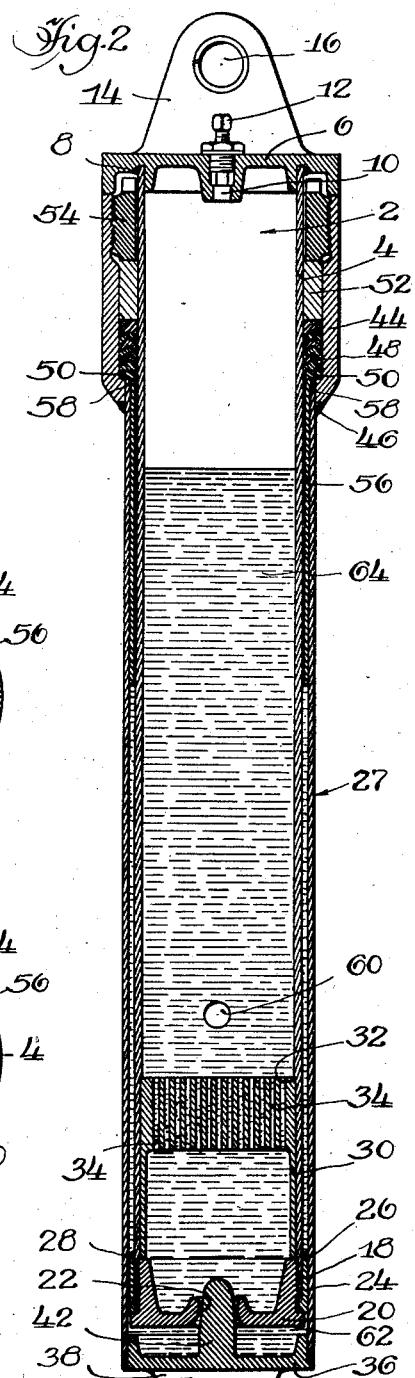
Inventors
Carl E. Tack
and Fred E. Bachman
Arne O. Farner Atty.

Patented Apr. 6, 1948

2,439,349

UNITED STATES PATENT OFFICE 2,439,349

SHOCK STRUT

Carl E. Tack and Fred E. Bachman, Chicago, Ill., assignors to American Steel Foundries, Chicago, Ill., a corporation of New Jersey Application October 6, 1944, Serial No. 557,420

3 Claims. (Cl. 267—64)

Our invention relates to hydraulic shock absorber devices and more particularly to what is commonly known as an oleo shock strut of the type wherein the hydraulic fluid within the device compresses on the closure stroke thereof a gas spring operable to return the piston and cylinder of the device to their normal extended position.

The general object of our invention is to provide means for eliminating turbulence of the hydraulic fluid before it comes into contact with the gas spring on the closure stroke of the device, thus preventing an undesirable condition commonly known in the art as "foaming" wherein the gas is entrapped in the hydraulic fluid.

A specific object of our invention is to provide baffle means between the gas spring and the metering means for the hydraulic fluid within the device, said baffle means being operable to diminish the velocity of the hydraulic fluid and develop friction therewith.

Another object of our invention is to mount a perforated baffle member within the piston between the compressed gas spring and the piston metering means for the hydraulic fluid within the device.

In the drawings,

Figure 1 is a sectional view of an oleo strut embodying our invention, said view being taken in a vertical plane substantially bisecting the device on the longitudinal axis thereof.

Figure 2 is a sectional view comparable to Figure 1 with the device shown in its fully compressed or closed position.

Figure 3 is a sectional view taken in the plane indicated by the line 3—3 of Figure 1.

Figure 4 is a sectional view comparable to Figure 3 but illustrating a modification of our invention.

Describing the invention in detail, the device comprises a top follower in the form of a piston generally designated 2, said piston comprising a cylinder or tube 4 connected at its upper end to a closure plate or head 6 as by welding at 8, said head 6 having an opening 10 therethrough provided with a conventional fitting 12 by means of which compressed gas such as air is forced into the upper end of the tube 2 for the purpose hereinafter described. A bracket 14 is formed on the top of the closure plate 6 and is provided with a bushed opening 16 for convenient connection to an associated aircraft (not shown). At its lower extremity the tube 2 is threaded at 18 for convenient connection to the piston head 20 having a central orifice 22 therethrough, and a ring 24 is compressed between the lower extremity of the tube 4 and the head 20, said ring being afforded a slidable fit at 26 within the bottom follower or cylinder generally designated 27 and being provided with one or more vertical grooves 28 for a purpose hereinafter described in detail.

A baffle member 30 is compressed between the upper extremity of the head 20 and a shoulder 32 within the tube 4, said baffle member 30 being provided with a plurality of passages 34, 34 having a total cross-sectional area, as seen in Figure 3, greater than the orifice 22. It may also be noted that the passages 34, 34 are of relatively great depth in order that fluid passing through the passages will develop friction against the walls thereof, thus diminishing the velocity of the fluid to a point at which turbulence thereof is substantially eliminated.

The lower end of the cylinder is provided with a head 36 having on the bottom thereof a bracket 38 with a bushed opening 40 for convenient connection to the landing gear (not shown) of the aircraft. The top of the head 36 is formed with a dashpot piston or metering pin 42 adapted for reception within the orifice 22 at the end of the closure stroke of the device as seen in Figure 2, thus affording an increased dampening action at the end of said stroke, as will be clearly understood by those skilled in the art.

The upper end of the cylinder 27 is provided with a collar 44 secured thereto as by welding at 46 and adapted for the reception of a packing gland assembly 48, which assembly affords a slidable fluidtight fit for the piston 2 within the cylinder 27. The packing gland assembly 48 is seated at its lower end against a ring 50 and at its upper end against a bearing 52 which is compressed against the packing gland assembly by means of a packing gland nut 54. The ring 50 bears against a sleeve 56 snugly fitted within the cylinder 27 in shouldered engagement therewith as at 58 at the upper extremity thereof.

It will be understood that on the extension stroke of the device, as seen in Figure 1, the lower end of the sleeve 56 engages the upper end of the ring 24 to limit the extension stroke. A dashpot or dampening action is achieved at the end of the extension stroke by means of fluid entrapped between the piston 2 and the cylinder 27, said fluid being forced outwardly through the grooves 28, 28 by means of the sleeve 56, and one or more openings 60 may be provided through the tube 4 of the piston 2 so that the hydraulic fluid within the device may freely pass into the space between the piston and the cylinder 27 on the closure stroke of the device.

On the closure or compression stroke of the device, the hydraulic fluid within the cylinder 27 is forced through the restricted orifice 22. This causes the hydraulic fluid to pass from the high pressure chamber 62 within the cylinder 27 into the low pressure chamber 64 within the piston 2 at a relatively high velocity causing what is known as turbulent flow of the fluid; however, as the fluid passes through the passages 34, 34 of the baffle member 30, the velocity of flow is greatly reduced due to the friction developed by the fluid against the walls of the passages and due to the fact that the total horizontal cross-sectional area of the passages 34, 34 is substantially greater than the corresponding cross-sectional area of the orifice 22. By virtue of this arrangement the flow of the hydraulic fluid after it has passed through the baffle member 30 becomes laminar rather than turbulent, thereby preventing the objectionable foaming action prevalent in struts constructed according to the prior art.

It may be noted that our invention is based on the well known Reynold's criterion $$\frac{VDS}{U}$$

where V is the mean velocity of the liquid, D is the diameter of the passage, S is the specific gravity of the liquid, and U is the absolute viscosity of the liquid. It will be understood that absolute viscosity is defined for this purpose as the resistance offered by, or the "drag" transmitted through, the liquid by a layer of the liquid of unit area to the motion parallel to this area of another layer of the liquid. It has been demonstrated experimentally that there is a laminar or streamline flow if this criterion has a value less than approximately two thousand, and accordingly, the passages 34, 34 of our baffle member 30 are preferably designed to obtain a Reynold's number of approximately 1100, thus insuring laminar rather than turbulent flow of the hydraulic fluid after it has passed through the passages 34, 34.

Figure 4 is a sectional view comparable to Figure 3 illustrating a modification of our invention wherein the passages 34, 34 are in the form of elongated slots rather than round openings as in the embodiment of Figures 1-3 inclusive.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In an hydraulic shock absorber device, a bottom follower in the form of a cylinder containing hydraulic fluid, a top follower in the form of a hollow piston slidably reciprocal within said cylinder, said piston comprising a head at its lower end with a central orifice communicating with a chamber in said piston, a compressed gas spring in the upper extremity of said chamber for resisting the closure stroke of the device, means carried by said piston within said chamber intermediate said orifice and said spring for reducing the turbulence of the hydraulic fluid forced through said orifice on the closure stroke of the device, said means comprising a member with a plurality of fluid passages therethrough, the total cross-sectional area of said passages being greater than that of said orifice and affording a Reynold's number of less than two thousand, and a metering pin carried by said cylinder and adapted for reciprocation within said orifice at the end of said closure stroke, the length of said pin being substantially less than the distance between said orifice and said member.

2. In an hydraulic shock absorber device, a bottom follower in the form of a cylinder containing hydraulic fluid, a top follower in the form of a hollow piston reciprocal within said cylinder, said piston comprising a head at its lower end with a central orifice communicating with a chamber within said piston, a compressed gas spring in the upper extremity of said chamber for resisting the closure stroke of the device, means carried by said piston within said chamber intermediate said orifice and said spring for reducing the turbulence of the hydraulic fluid forced through said orifice on the closure stroke of the device, said means comprising a member with a plurality of fluid passages therethrough, said passages having a greater vertical length than that of said orifice, the total cross-sectional area of said passages being greater than that of said orifice and affording a Reynold's number of less than two thousand, and a metering pin carried by said cylinder and adapted for reciprocation within said orifice at the end of said closure stroke, the length of said pin being substantially less than the distance between said orifice and said member.

3. In an hydraulic shock absorber device, a bottom follower in the form of a cylinder containing hydraulic fluid, a top follower in the form of a hollow piston reciprocal within said cylinder, an internal chamber within said piston, a head on the lower end of said piston comprising a central orifice communicating with said chamber, a compressed gas spring in the upper extremity of said chamber for resisting the closure stroke of the device, means carried by said piston within said chamber intermediate said orifice and said spring for reducing the turbulence of the hydraulic fluid forced through said orifice on the closure stroke of the device, said means comprising a member with a plurality of fluid passages therethrough adapted to afford a Reynold's number not exceeding two thousand, and a metering pin carried by said cylinder and adapted for reciprocation within said orifice at the end of said closure stroke, the length of said pin being substantially less than the distance between said orifice and said member.

CARL E. TACK.
FRED E. BACHMAN.

REFERENCES CITED

The following references are of record in the file of this patent:

UNITED STATES PATENTS

| Number | Name | Date |
|---|---|---|
| 953,414 | English | Mar. 29, 1910 |
| 1,125,942 | Blanchard | Jan. 26, 1915 |
| 1,387,081 | Springer | Aug. 9, 1921 |
| 1,512,903 | Brenne | Oct. 28, 1924 |
| 1,811,152 | Seversky | June 23, 1931 |
| 1,855,064 | Messier | Apr. 19, 1932 |
| 2,146,089 | Onions | Feb. 7, 1939 |
| 2,213,819 | Krueger et al. | Sept. 3, 1940 |
| 2,325,430 | Setz | July 27, 1943 |
| 2,370,942 | Dick | Mar. 6, 1945 |

FOREIGN PATENTS

| Number | Country | Date |
|---|---|---|
| 688,949 | France | May 20, 1930 |